United States Patent
Wu et al.

(10) Patent No.: US 11,317,362 B2
(45) Date of Patent: Apr. 26, 2022

(54) WIRELESS SENSOR NETWORK DEPLOYMENT STRUCTURE COMBINED WITH SFFT AND COA AND FREQUENCY SPECTRUM RECONSTRUCTION METHOD THEREFOR

(71) Applicant: University of Science and Technology of China, Anhui (CN)

(72) Inventors: Fangzhou Wu, Anhui (CN); Li Chen, Anhui (CN); Xiaohui Chen, Anhui (CN); Weidong Wang, Anhui (CN)

(73) Assignee: University of Science and Technology of China, Hefei (CN)

( * ) Notice: Subject to any disclaimer, the term of this patent is extended or adjusted under 35 U.S.C. 154(b) by 51 days.

(21) Appl. No.: 16/771,195

(22) PCT Filed: Jul. 11, 2018

(86) PCT No.: PCT/CN2018/095216
§ 371 (c)(1),
(2) Date: Jun. 9, 2020

(87) PCT Pub. No.: WO2019/144578
PCT Pub. Date: Aug. 1, 2019

(65) Prior Publication Data
US 2020/0374819 A1    Nov. 26, 2020

(30) Foreign Application Priority Data
Jan. 29, 2018    (CN) .......................... 201810083847.9

(51) Int. Cl.
*H04W 56/00*    (2009.01)
*H04L 25/02*    (2006.01)
(Continued)

(52) U.S. Cl.
CPC ............ *H04W 56/00* (2013.01); *H04L 25/02* (2013.01); *H04W 16/02* (2013.01); *H04W 84/18* (2013.01)

(58) Field of Classification Search
CPC . H04L 25/02; H04L 25/0212; H04L 25/0224; H04W 16/02; H04W 24/08; H04W 56/00; H04W 84/18
See application file for complete search history.

(56) References Cited

U.S. PATENT DOCUMENTS

| 2007/0027656 A1* | 2/2007 | Baraniuk | ............... H04N 19/60 |
| | | | 702/189 |
| 2010/0082302 A1* | 4/2010 | Garudadri | .......... G06K 9/00496 |
| | | | 702/189 |

(Continued)

FOREIGN PATENT DOCUMENTS

| CN | 102594515 A | * | 7/2012 |
| CN | 102594515 A | | 7/2012 |

(Continued)

OTHER PUBLICATIONS

Abari et al., "Over-the-air Function Computation in Sensor Networks", Dec. 2016, CoRR, vol. abs/1612.02307, 2016, pp. 1-8, [online] Available: http://arxiv.org/abs/1612.02307. Total pp. 8 (Year: 2016).*

(Continued)

*Primary Examiner* — Shah M Rahman
(74) *Attorney, Agent, or Firm* — Wolf, Greenfield & Sacks, P.C.

(57) ABSTRACT

A wireless sensor network deployment structure combined with SFFT and COA and a frequency spectrum reconstruction method therefor. The wireless sensor network deployment structure includes: frequency spectrum acquisition sensor nodes dispersed in each region, and a sink node, wherein all the frequency spectrum acquisition sensor nodes (Continued)

have the same structure, and include: a broadband frequency spectrum antenna, a delayer, an ADC, a first baseband processing module, a DAC and a transmitting antenna that are successively connected; all the frequency spectrum acquisition sensor nodes are cooperated to realize SFFT and COA of signals; the signals transmitted by all the frequency spectrum acquisition sensor nodes are superimposed over the air and received by the sink node; and the sink node extracts a data domain from a received signal frame by post-processing, thereby completing frequency spectrum reconstruction. The solution can be easily deployed in an existing wireless sensor network without changing the traditional ADC working mode and communication mode; moreover, the delay is shorter, the sampling rate of the reconstructed frequency spectrum is higher, and the complexity is lower.

7 Claims, 6 Drawing Sheets

(51) Int. Cl.
*H04W 16/02* (2009.01)
*H04W 84/18* (2009.01)

(56) References Cited

U.S. PATENT DOCUMENTS

| | | | | |
|---|---|---|---|---|
| 2010/0310011 | A1* | 12/2010 | Sexton | H04L 67/12 375/316 |
| 2011/0136536 | A1* | 6/2011 | Garudadri | G01D 21/00 455/550.1 |
| 2011/0149791 | A1* | 6/2011 | Wang | H04K 3/226 370/252 |
| 2013/0070624 | A1* | 3/2013 | Nguyen | H04W 24/08 370/252 |
| 2015/0146826 | A1* | 5/2015 | Katabi | H04B 1/16 375/340 |
| 2017/0099113 | A1* | 4/2017 | Letourneau | H04B 10/2507 |
| 2018/0083816 | A1* | 3/2018 | Bolstad | H01Q 21/0025 |
| 2019/0364492 | A1* | 11/2019 | Azizi | H04W 48/16 |

FOREIGN PATENT DOCUMENTS

| | | |
|---|---|---|
| CN | 105572649 A | 5/2016 |
| CN | 106304191 A | 1/2017 |
| CN | 108259095 A | 7/2018 |
| WO | WO 2006/122146 A2 | 11/2006 |

OTHER PUBLICATIONS

Yang et al., "Compressive Sensing based on Local Regional Data in Wireless Sensor Networks", Apr. 1-4, 2012, IEEE Wireless Communications and Networking Conference: Mobile and Wireless Networks (WCNC) 2012, pp. 2306-2311, Total pp. 6 (Year: 2012).*

Mohapatra et al. "FFT and Sparse FFT techniques and applications", Feb. 24-26, 2017, IEEE, 2017 Fourteenth International Conference on Wireless and Optical Communications Networks (WOCN), Total pp. 5 (Year: 2017).*

Guo et al., "Optimized Local Superposition in Wireless Sensor Networks with T-average-mutual-coherence," 2012, Progress in Electromagnetics Research, vol. 122, pp. 389-411, 2012. (Year: 2012).*

International Search Report and Written Opinion for International Application No. PCT/CN2018/095216, dated Sep. 27, 2018.

Zhong et al., Recent Advances in the Sparse Fourier Transform. Transactions of Beijing Institute of Technology. Feb. 28, 2017;37(2):111-8.

* cited by examiner ns to aplenty available sensor nodes. In
WIRELESS SENSOR NETWORK DEPLOYMENT STRUCTURE COMBINED WITH SFFT AND COA AND FREQUENCY SPECTRUM RECONSTRUCTION METHOD THEREFOR This application is a national stage filing under 35 U.S.C. § 371 of International Patent Application Serial No. PCT/CN2018/095216, filed Jul. 11, 2018, which claims priority to Chinese Patent Application No. 201810083847.9, titled "WIRELESS SENSOR NETWORK DEPLOYMENT STRUCTURE COMBINED WITH SFFT AND COA AND FREQUENCY SPECTRUM RECONSTRUCTION METHOD THEREFOR", filed on Jan. 29, 2018, with the China National Intellectual Property Administration. The contents of these applications are incorporated herein by reference in their entirety.

FIELD

The present disclosure relates to the field of wireless sensor network and spectrum reconstruction technology, and particularly, to a deployment structure of wireless sensor network combined with SFFT and COA and a spectrum reconstruction method thereof.

BACKGROUND

Sparse fast Fourier transform (SFFT) technology is a fast algorithm of sparse Fourier transform (SFT). Its core idea is to segment a signal obtained by high-rate sampling, so to be equivalent to several sets of low-rate sampled signals. By processing these sets of low-rate sampled signals, an effect of reconstructing an original signal can be achieved. Theoretically speaking, the more the low-rate Analog-to-Digital Converters (ADC) involved in sampling, the higher the equivalent sampling frequency, which avoids the use of expensive high-rate ADC and saves costs. In addition, SFFT can have lower complexity than the traditional fast Fourier transform (FFT) algorithm, which can improve performance.

Computation over Air (COA) is a data transmission method used in a wireless sensor network. Since an ultimate purpose of transmitting data for all sensors in a wireless sensor network is to achieve a specific function (such as sum, average, maximum, and minimum) with little attention to data in a transmission process, rather than collecting the data of each sensor one by one, it is better to directly collect results of the highest interest by special means. Accordingly, COA comes into being. A primary idea of COA is to pre-process collected signals at a transmitter, to achieve superposition through a wireless channel, and finally to perform post-processing of the signal at a receiver to achieve a specific function operation. A main advantage of COA is that it does not need to collect data of all the sensors in order to get the desired result, which makes data collection easy, reduces an amount of data interaction, and lowers a transmission delay and a processing amount.

Spectrum reconstruction is one of the key technologies in a spectrum sharing system. Its purpose is to collect a target signal source through the sensor, so that its spectrum can be reconstructed, from which spectrum occupation information can be extracted or by which signal demodulation can be performed.

With the rise of 5G and rapid development of the Internet of Things, more and more sensors are connected to the network, which leads to aplenty available sensor nodes. In addition, available spectrum resources become scarcer, and thus the real-time analysis of the spectrum is even more important. Therefore, how to deploy a wireless sensor network and complete spectrum reconstruction is particularly important. However, there is no effective solution at present.

SUMMARY

An object of the present disclosure is to provide a deployment structure of wireless sensor network combined with SFFT and COA and a spectrum reconstruction method thereof, which can conveniently deploy a sensor node into an existing wireless sensor network without changing an operation mode and a communication mode of a traditional ADC. At the same time, a smaller delay, a higher sampling rate of the reconstructed spectrum, and a lower complexity can be achieved.

The object of the present disclosure is achieved by following technical solutions.

A deployment structure of wireless sensor network combined with SFFT and COA includes: spectrum collection sensor nodes dispersed in respective areas, and a sink node, where each spectrum collection sensor node is configured to cooperate with other spectrum collection sensor nodes to receive a signal in free space, sample the signal with an ADC, perform SFFT and preprocessing on the sampled digital signal, transmit the sampled digital signal into the air, and complete superposition computation over the air finally; and the sink node is configured to receive a signal obtained by superimposing in an over-the-air manner signals transmitted by all the spectrum collection sensor nodes, and extract a data domain from a received signal frame through frame synchronization and post-processing to complete spectrum reconstruction.

Optionally, each spectrum collection sensor node includes: a broadband spectrum antenna, a delayer, an ADC, a first baseband processing module, a Digital-to-Analog Converter (DAC) and a transmitting antenna connected in sequence, where the broadband spectrum antenna is configured to receive an electromagnetic wave in free space to obtain a first analog signal, where a frequency range of the electromagnetic wave in free space is 0 Hz to 6 GHz;

the delayer is configured to delay the first analog signal so that the first analog signal meets a sub-Nyquist sampling criterion;

the ADC is configured to convert the delayed first analog signal into a digital signal;

the first baseband processing module is configured to process the digital signal obtained by sampling;

the DAC is configured to convert the processed digital signal into a second analog signal; and the transmitting antenna is configured to transmit the second analog signal into free space.

Optionally, the first baseband processing module includes: a fast Fourier transform (FFT) module, a preprocessing module, and a pulse-shaping filter, where the FFT module is configured to perform an FFT on the digital signal obtained by sampling with the ADC;

the preprocessing module is configured to process the digital signal outputted from the FFT module by performing channel compensation, power compensation, and rotation factor compensation on the signal and packaging the signal into a signal frame; and the pulse-shaping filter is configured to reduce inter-symbol interference, where a signal passing through the pulse-shaping filter is sent to the DAC.

Optionally, the sink node includes: a receiving antenna, an ADC, and a second baseband processing module connected in sequence, where the second baseband processing module includes a frame synchronization module, a post-processing module, and a data memory;

the receiving antenna is configured to receive the signal obtained by superimposing in an over-the-air manner the signals transmitted by all the spectrum collection sensor nodes;

the ADC is configured to convert an analog signal from the receiving antenna into a digital signal;

the frame synchronization module is configured to determine a frame header of the digital signal, align symbols at the same time, then extract a digital signal of a data domain portion and send the extracted digital signal to the post-processing module;

the post-processing module is configured to adjust a power gain of the digital signal of the data domain portion so that an output result of the post-processing module is a correct spectrum; and the data memory is configured to store the obtained spectrum to complete spectrum reconstruction.

A broadband wireless spectrum reconstruction method applied to the above deployment structure of the wireless sensor network is provided, where the total number of spectrum collection sensor nodes in the wireless sensor network is L, and L is a positive integer. The method includes the following steps:

receiving a signal in free space, sampling the signal with an ADC, performing SFFT and preprocessing on the sampled digital signal, transmitting the sampled digital signal into the air, and completing superposition computation over the air finally, by each spectrum collection sensor cooperating with other spectrum collection sensor nodes; and receiving a signal obtained by superimposing in an over-the-air manner signals transmitted by all the spectrum collection sensor nodes, and extracting a data domain from a received signal frame through frame synchronization and post-processing to complete spectrum reconstruction, by the sink node.

Optionally, each spectrum collection sensor node comprises: a broadband spectrum antenna, a delayer, an ADC, a first baseband processing module, a DAC and a transmitting antenna connected in sequence; and the receiving a signal in free space, sampling the signal with an ADC, performing SFFT and preprocessing on the sampled digital signal, transmitting the sampled digital signal into the air, and completing superposition computation over the air finally, by each spectrum collection sensor cooperating with other spectrum collection sensor nodes, includes:

receiving, by the broadband spectrum antenna, an electromagnetic wave in free space to obtain a first analog signal, where a frequency range of the electromagnetic wave in free space is 0 Hz to 6 GHz;

delaying, by the delayer, the first analog signal so that the first analog signal meets a sub-Nyquist sampling criterion;

converting, by the ADC, the delayed first analog signal into a digital signal;

processing, by the first baseband processing module, the digital signal obtained by sampling;

converting, by the DAC, the processed digital signal into a second analog signal; and transmitting, by the transmitting antenna, the second analog signal into free space.

Optionally, the first baseband processing module includes: an FFT module, a preprocessing module, and a pulse-shaping filter; and the processing, by the first baseband processing module, the digital signal obtained by sampling includes:

performing, by the FFT module, a fast Fourier transform on the digital signal obtained by sampling with the ADC;

processing, by the preprocessing module, the digital signal outputted from the FFT module by performing channel compensation, power compensation, and rotation factor compensation on the signal and packaging the signal into a signal frame; and reducing, by the pulse-shaping filter, inter-symbol interference, where a signal passing through the pulse-shaping filter is sent to the DAC.

Optionally, the sink node includes: a receiving antenna, an ADC, and a second baseband processing module connected in sequence, where the second baseband processing module includes a frame synchronization module, a post-processing module, and a data memory; and the receiving a signal obtained by superimposing in an over-the-air manner signals transmitted by all the spectrum collection sensor nodes, and extracting a data domain from a received signal frame through frame synchronization and post-processing to complete spectrum reconstruction, by the sink node, includes:

receiving, by the receiving antenna, the signal obtained by superimposing in an over-the-air manner the signals transmitted by all the spectrum collection sensor nodes;

converting, by the ADC, an analog signal from the receiving antenna into a digital signal;

determining a frame header of the digital signal, aligning symbols at the same time, then extracting a digital signal of a data domain portion and sending the extracted digital signal to the post-processing module, by the frame synchronization module;

adjusting, by the post-processing module, a power gain of the digital signal of the data domain portion so that an output result of the post-processing module is a correct spectrum; and storing, by the data memory, the obtained spectrum to complete spectrum reconstruction.

A broadband wireless spectrum reconstruction method applied to the above deployment structure of the wireless sensor network is provided, where the total number of spectrum collection sensor nodes in the wireless sensor network is L, and L is a positive integer. The method includes the following steps 1) to 6), where in step 1), L spectrum collection sensor nodes sample a signal s(t) in free space with a sampling frequency of $f_s/L$ and a sampling time of $T_s$, where an $l^{th}$ spectrum collection sensor node collects a sequence $s_l(m)$ with a length of M, L being a positive integer;

in step 2), each spectrum collection sensor node performs an M-point FFT on the collected sequence $s_l(m)$ through the FFT module in the first baseband processing module to obtain a sparse spectrum sequence, where this step is expressed by the following formula:

$$X_l(k) = \sum_{m=0}^{M-1} s_l(m) W_M^{km},$$

where k=0 ... M−1, and $$W_M^{km} = e^{-j\frac{2\pi}{M}km}$$

is a rotation factor in Fourier transform;

in step 3), a to-be-sent symbol sequence is obtained after the sparse spectrum sequence $X_l(k)$ passes through the preprocessing module, where this step is expressed by the following formula:

$$x_l(k)=\varphi_l W_N^{kl} X_l(k \bmod M),$$

where k=0 ... N−1, $$W_N^{kl} = e^{-j\frac{2\pi}{N}kl}$$

is a rotation factor in Fourier transform, mod is a remainder operation, $h_l$ is a channel response of the $l^{th}$ spectrum collection sensor node, η is a receiving level, $\varphi_l$ is a preprocessing coefficient of the $l^{th}$ spectrum collection sensor node, and $h_l\varphi_l=\eta$;

in step 4), the to-be-sent symbol sequence $x_l(k)$ is transmitted into the air after passing through the pulse-shaping filter;

in step 5), signals transmitted by the L spectrum collection sensor nodes are superimposed over the air and received by the sink node through a wireless channel, where a received signal is expressed by the following formula:

$$\hat{S}(k) = \eta \sum_{l=0}^{L-1} W_N^{kl} X_l(k \bmod M) + n(k),$$

where k=0 ... N−1, and n(k) is noise; and in step 6), the sink node performs a post-processing module to obtain a reconstructed broadband wireless spectrum, where the reconstructed broadband wireless spectrum is expressed by the following formula:

$$\hat{S}(k)/\eta = S(k) + n(k)/\eta,$$

where $$S(k) = \sum_{l=0}^{L-1} W_N^{kl} \sum_{m=0}^{M-1} s_l(m) W_M^{km} = \sum_{n=0}^{N-1} s(nT_s) W_N^{kn}$$

is a spectrum of an ideal noiseless signal s(n) with an observation bandwidth $f_s$, k=0 ... N−1, and n(k) is noise.

It can be seen from the technical solution provided by the present disclosure that when L wireless sensor nodes (spectrum collection sensor nodes) are used for low-rate sampling and the sampling frequency is $f_s/L$, a broadband wireless spectrum with a high sampling rate and a sampling frequency of $f_s$ can be reconstructed at the sink node. This solution is compatible with an existing wireless sensor module which can be easily deployed into a current wireless sensor network. The computing network and the communication network are integrated by means of COA, so that the spectrum reconstruction method of the present disclosure can effectively reduce an amount of transmitted data, decrease a delay, and reduce the cost of wireless sensor nodes and a number of calculations.

BRIEF DESCRIPTION OF THE DRAWINGS

For a clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

The technical solutions according to the embodiments of the present application will be described clearly and completely as follows in conjunction with the drawings in the embodiments of the present application. It is apparent that the described embodiments are only a part of the embodiments according to the present application, rather than all the embodiments. Any other embodiments obtained by those skilled in the art based on the embodiments in the present application without any creative efforts fall within the protection scope of the present application.

Figure 1:
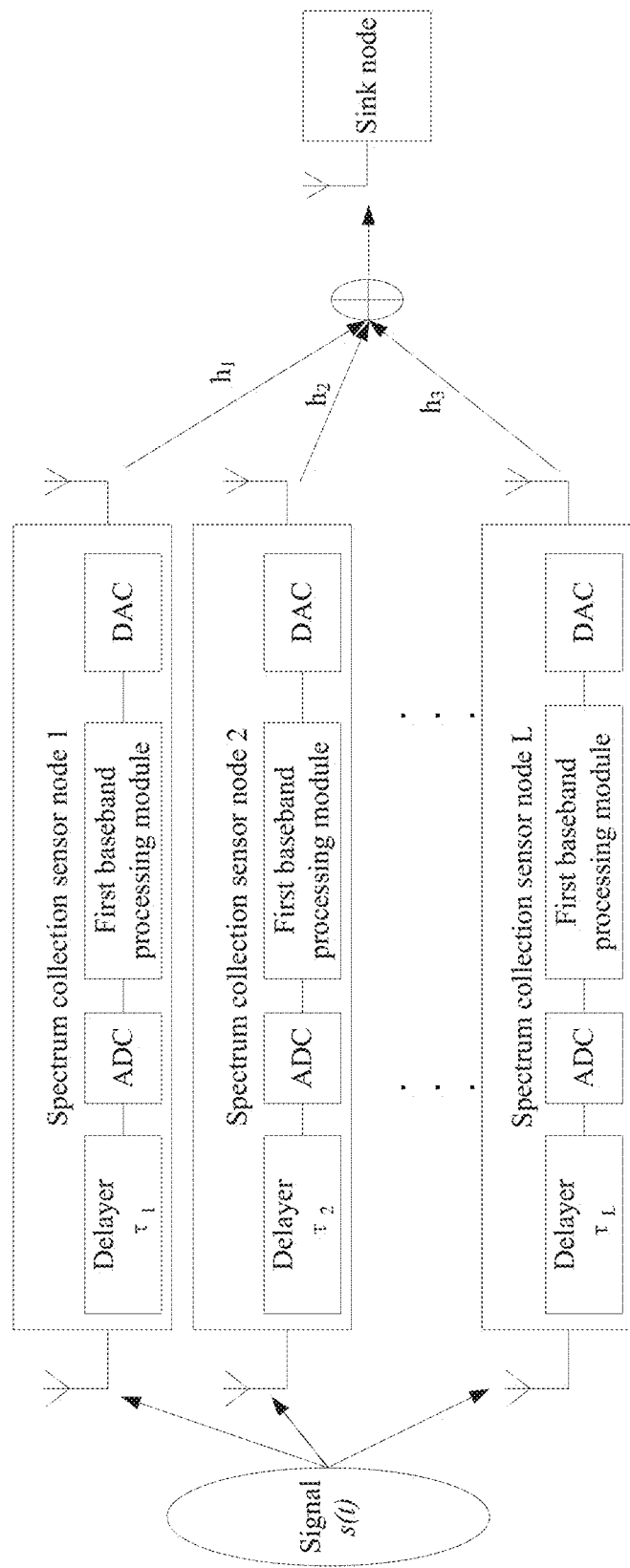
FIG. 1 is a schematic diagram of a deployment structure of wireless sensor network combined with SFFT and COA according to an embodiment of the present disclosure.

A deployment structure of wireless sensor network combined with SFFT and COA is provided in an embodiment of the present disclosure. As illustrated in FIG. 1, the deployment structure mainly includes: L spectrum collection sensor nodes dispersed in respective areas, and a sink node, where L is a positive integer.

Each spectrum collection sensor is configured to cooperate with other spectrum collection sensor nodes to receive a signal in free space, sample the signal with an ADC, perform SFFT and preprocessing on the sampled digital signal, transmit the sampled digital signal into the air, and complete superposition computation over the air finally.

The sink node is configured to receive a signal obtained by superimposing in an over-the-air manner signals transmitted by all the spectrum collection sensor nodes, and extract a data domain from a received signal frame through frame synchronization and post-processing to complete spectrum reconstruction.

Figure 2:
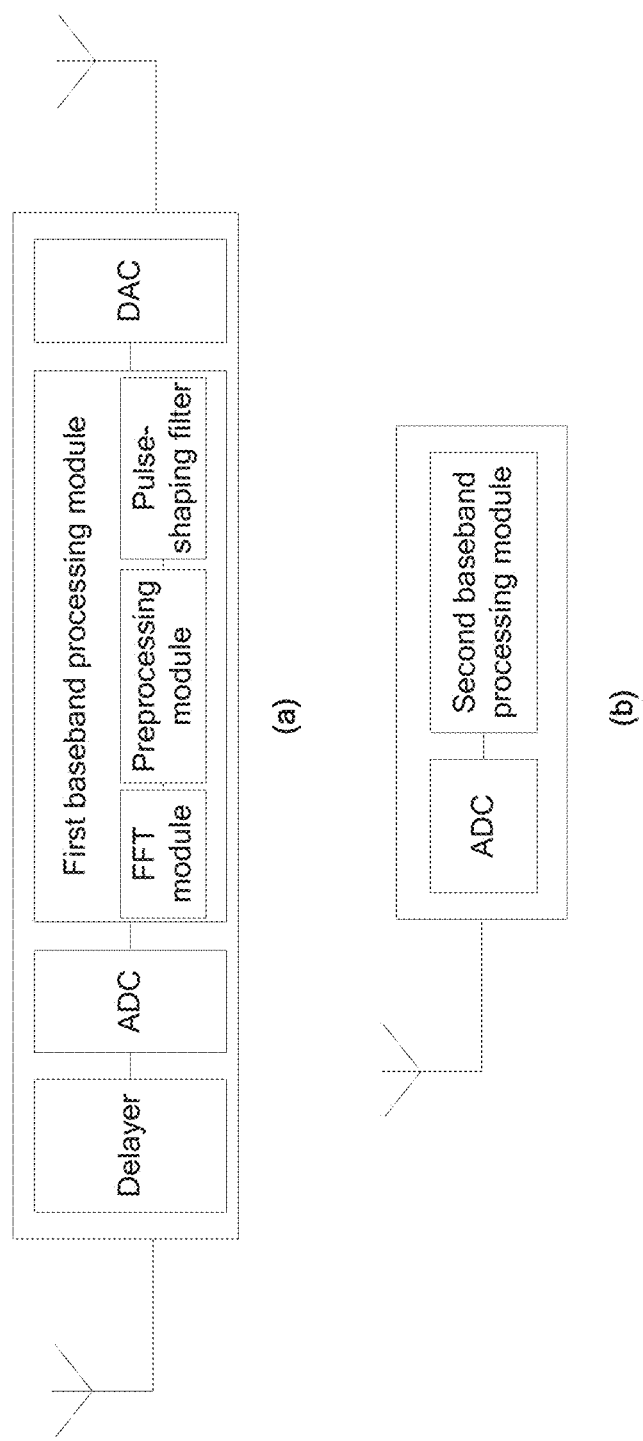
FIGS. 2(a) and 2(b) are schematic views of spectrum collection sensor nodes and a sink node according to an embodiment of the present disclosure.

All the spectrum collection sensor nodes have the same structure. As illustrated in FIGS. 1 and 2(a), each spectrum collection sensor node includes: a broadband spectrum antenna, a delayer, an ADC, a first baseband processing module, a DAC and a transmitting antenna connected in sequence.

The broadband spectrum antenna is configured to receive an electromagnetic wave in free space to obtain a first analog signal, where a frequency range of the electromagnetic wave in free space is 0 Hz to 6 GHz.

The delayer is configured to delay the first analog signal so that the first analog signal meets a sub-Nyquist sampling criterion.

The ADC is configured to convert the delayed first analog signal into a digital signal.

The first baseband processing module is configured to process the digital signal obtained by sampling.

The DAC is configured to convert the processed digital signal into a second analog signal.

The transmitting antenna is configured to transmit the second analog signal into free space.

In an embodiment of the present disclosure, the first baseband processing module mainly includes: an FFT module, a preprocessing module, and a pulse-shaping filter.

The FFT module is configured to perform an FFT on the digital signal obtained by sampling with ADC.

The preprocessing module is configured to process the digital signal outputted from the FFT module by performing channel compensation, power compensation, and rotation factor compensation on the signal and packaging the signal into a signal frame.

The pulse-shaping filter is configured to reduce inter-symbol interference, where a signal passing through the pulse-shaping filter is sent to the DAC.

In an embodiment of the present disclosure, as illustrated in FIG. 2(b), the sink node mainly includes: a receiving antenna, an ADC, and a second baseband processing module connected in sequence, where the second baseband processing module includes a frame synchronization module, a post-processing module, and a data memory.

The receiving antenna is configured to receive the signal obtained by superimposing in an over-the-air manner the signals the transmitted by all the spectrum collection sensor nodes.

The ADC is configured to convert an analog signal from the receiving antenna into a digital signal.

The frame synchronization module is configured to determine a frame header of the digital signal, align symbols at the same time, then extract a digital signal of a data domain portion and send the extracted digital signal to the post-processing module.

The post-processing module is configured to adjust a power gain of the digital signal of the data domain portion so that an output result of the post-processing module is a correct spectrum.

The data memory is configured to store the obtained spectrum to complete spectrum reconstruction.

In an embodiment of the present disclosure, in order to reconstruct a spectrum of sampling frequency $f_s$ at the sink center; the method of combining SFFT and COA to realize broadband wireless spectrum reconstruction includes the following 1) to 6), where in step 1), L spectrum collection sensor nodes sample a signal s(t) in free space with a sampling frequency of $f_s/L$ and a sampling time of $T_s$, where an $l^{th}$ spectrum collection sensor node collects a sequence $s_l(m)$ with a length of M, L being a positive integer;

in step 2), each spectrum collection sensor node performs an M-point FFT on the collected sequence $s_l(m)$ through the FFT module in the first baseband processing module to obtain a sparse spectrum sequence, where this step is expressed by the following formula:

$$X_l(k) = \sum_{m=0}^{M-1} s_l(m) W_M^{km},$$

where k=0 . . . M−1, and $$W_M^{km} = e^{-j\frac{2\pi}{M}km}$$

is a rotation factor in Fourier transform;

in step 3), a to-be-sent symbol sequence is obtained after the sparse spectrum sequence $X_l(k)$ passes through the preprocessing module, where this step is expressed by the following formula:

$$x_l(k) = \varphi_l W_N^{kl} X_l(k \bmod M),$$

where k=0 . . . N−1, $$W_N^{kl} = e^{-j\frac{2\pi}{N}kl}$$

is a rotation factor in Fourier transform, mod is a remainder operation, $h_l$ is a channel response of the $l^{th}$ spectrum collection sensor node. η is a receiving level, $\varphi_l$ is a preprocessing coefficient of the $l^{th}$ spectrum collection sensor node, and $h_l \varphi_l = \eta$;

in step 4), the to-be-sent symbol sequence $x_l(k)$ is transmitted into the air after passing through the pulse-shaping filter;

in step 5), signals transmitted by the L spectrum collection sensor nodes are superimposed over the air and received by the sink node through a wireless channel, where a received signal is expressed by the following formula:

$$\hat{S}(k) = \eta \sum_{l=0}^{L-1} W_N^{kl} X_l(k \bmod M) + n(k),$$

where k=0 . . . N−1, and n(k) is noise; and in step 6), the sink node performs a post-processing module to obtain a reconstructed broadband wireless spectrum, where the reconstructed broadband wireless spectrum is expressed by the following formula:

$$\hat{S}(k)/\eta = S(k) + n(k)/\eta,$$

where $$S(k) = \sum_{l=0}^{L-1} W_N^{kl} \sum_{m=0}^{M-1} s_l(m) W_M^{km} = \sum_{n=0}^{N-1} s(nT_s) W_N^{kn}$$

is a spectrum of an ideal noiseless signal s(n) with an observation bandwidth $f_s$, k=0 . . . N−1, and n(k) is noise.

Figure 4:
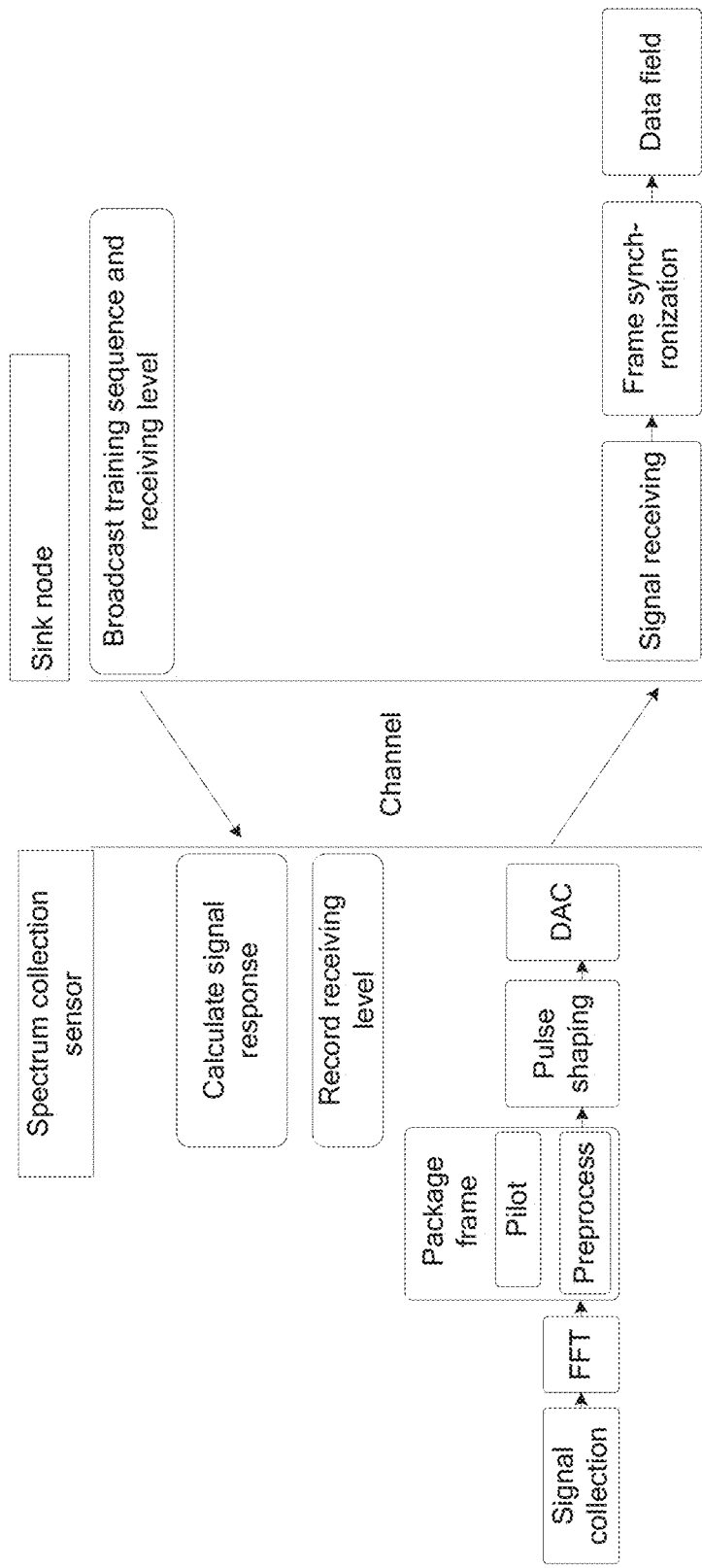
FIG. 4 is a communication and working flowchart between the spectrum collection sensor nodes and the sink node.

To facilitate understanding, a communication process between nodes in the deployment structure of wireless sensor network illustrated in FIG. 1 is described as follows in conjunction with FIG. 4:

1) the sink node broadcasts a set of known training sequences and the receiving level η. The $l^{th}$ spectrum collection sensor calculates its own channel response $h_l$ through the training sequence and records the receiving level η;

2) a to-be-observed signal passes through the delayer, is collected by the broadband spectrum antenna of the $l^{th}$ spectrum collection sensor, and then is subjected to a low-rate ADC sampling to obtain an M-point discrete sequence;

3) the discrete sequence is outputted through the FFT module, and an output result is pre-processed using a pre-processing coefficient calculated with $\eta$ and $h_l$. Then the data is packaged into a frame, and the frame is sent to the DAC for digital-to-analog conversion after passing through the pulse-shaping filter, and is finally transmitted by a transmitting antenna;

4) the signals transmitted by the L spectrum collection sensor nodes are superimposed over the air and received by the sink node; and 5) the sink node uses the training sequence in the signal frame for frame synchronization, and then cuts out a data field portion of the frame to obtain a reconstructed spectrum.

In a traditional wireless sensor network, transmitting the signals transmitted by the L spectrum collection sensor nodes requires the use of a channel for L times. In the deployment structure of this wireless sensor network, the channel is only used twice to complete the final spectrum reconstruction, which greatly reduces the amount of data transmitted and transmission delay.

The beneficial effects of the technical solutions according to the embodiments of the present disclosure are described below in conjunction with FIGS. 3, 5 and a performance test chart illustrated in FIG. 6.

Test parameters: the number of spectrum collection sensor nodes is 2, the number of sink nodes is 1, a sampling frequency of each spectrum collection sensor node is 50 MB/s, an operating frequency range of the broadband spectrum antenna is 1 GHz to 6 GHz, and an operating range of the signal transmitting antenna and receiving antenna is 2.4 GHz to 2.5 GHz.

Figure 3:
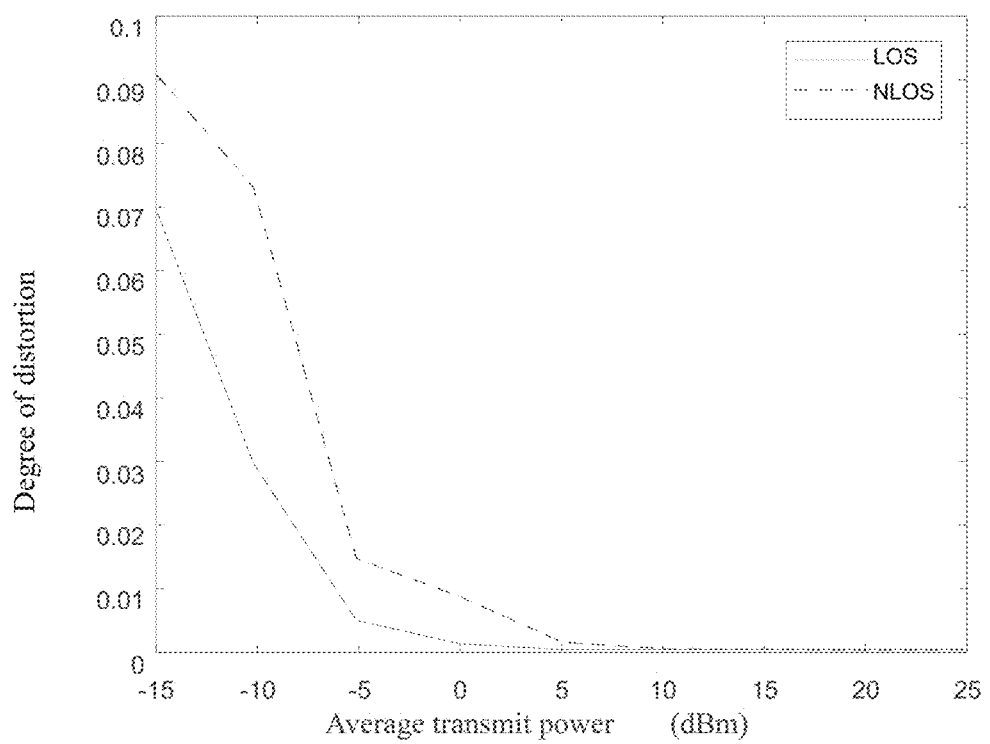
FIG. 3 is a schematic diagram of a relationship between an average transmit power of the spectrum collection sensor nodes and a degree of spectral distortion.

In FIG. 3, the abscissa is an average transmit power of the spectrum collection sensor nodes, and the ordinate is the degree of distortion. The smaller the degree of distortion, the better the effect of spectrum reconstruction. It can be found from FIG. 3 that the present disclosure can achieve the purpose of reconstructing spectrum. And when the transmit power is as low as −15 dBm, the degree of spectral distortion is still less than 0.1, and as the transmit power increases, the degree of distortion can be as low as negligible. Tests are performed under the conditions of Line-of-Sight (LOS) and Non-Line-of-Sight (NLOS), respectively. Test results show that in the case of NLOS, as the energy of the transmitted signal decreases, the degree of distortion increases, which is in line with expectations. However even if the degree of distortion increases, the increment is within an acceptable range.

Figure 5:
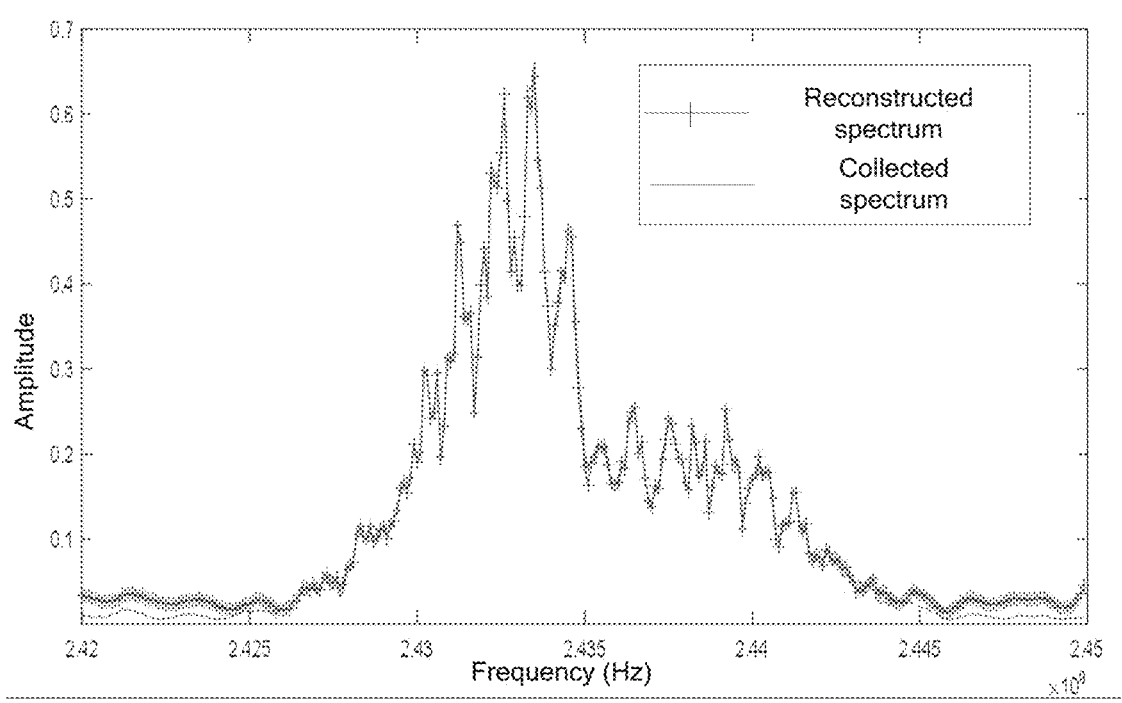
FIG. 5 is a comparison between a reconstructed spectrum and a collected spectrum (a real spectrum) in a spectrum range of 2.42 GHz to 2.45 GHz.
Figure 6:
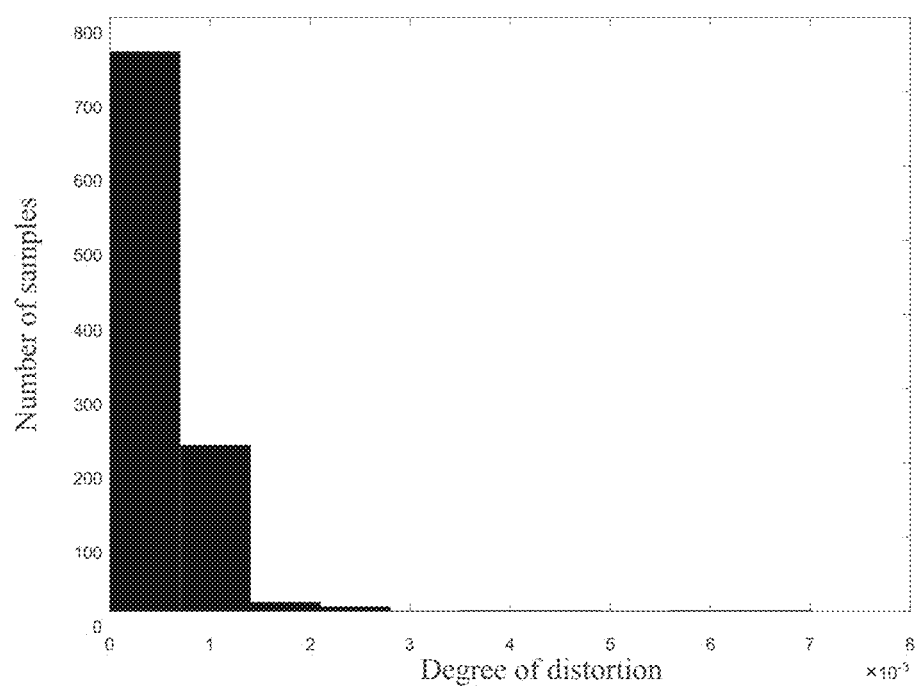
FIG. 6 is a statistical histogram of a degree of distortion between the reconstructed spectrum and the collected spectrum (the real spectrum).

In FIG. 5, the abscissa is a range of a cut spectrum, and the ordinate is amplitudes of the reconstructed spectrum and the real spectrum. Provided is a section of spectrum cut from the broadband spectrum, and the spectrum range thereof is from 2.42 GHz to 2.445 GHz, within which there is an OFDM symbol with a bandwidth of about 20 MHz. It can be seen from FIG. 5 that there is no significant difference between the reconstructed spectrum and the collected spectrum (the real spectrum). In order to further illustrate that the present disclosure can achieve the purpose of the reconstructing spectrum, and accuracy of the reconstructed spectrum is sufficiently high, a statistical histogram illustrated in FIG. 6 is used for description. FIG. 6 is a statistical histogram of a degree of distortion between the reconstructed spectrum and the real spectrum. In FIG. 6, the abscissa is a numerical interval of the degree of distortion, and the ordinate is the number of samples that fall within the interval. It can be found that the degree of distortion is generally lower than $3 \times 10^{-3}$, which shows that the present disclosure can achieve the purpose of reconstructing spectrum.

Therefore, the present disclosure realizes the function of reconstructing a high-rate sampled broadband wireless spectrum at the sink node by using the sensor nodes to perform low-rate sampling, which is compatible with the existing wireless sensor module and can be conveniently deployed into a current wireless sensor. In addition, the spectrum reconstruction method of the present disclosure has characteristics of simple implementation, small delay, low calculation amount, and low equipment configuration requirement.

The above are only the preferred embodiments of the present disclosure, but the scope of protection of the present disclosure is not limited thereto. Changes or replacements that can be easily thought by any person skilled in the art should be within the protection scope of the present disclosure. Therefore, the protection scope of the present disclosure shall be defined by the protection scope of the claims.

The invention claimed is:

1. A deployment structure of wireless sensor network combined with Sparse Fast Fourier Transform (SFFT) and Computation Over Air (COA), comprising: spectrum collection sensor nodes dispersed in respective areas, and a sink node,
   wherein each spectrum collection sensor node is configured to cooperate with other spectrum collection sensor nodes to receive a signal in free space, sample the signal with an Analog-to-Digital Converter (ADC), perform SFFT and preprocessing on the sampled digital signal, transmit the sampled digital signal into the air, and complete superposition computation over the air finally; and
   the sink node is configured to receive a signal obtained by superimposing in an over-the-air manner signals transmitted by all the spectrum collection sensor nodes, and extract a data domain from a received signal frame through frame synchronization and post-processing to complete spectrum reconstruction, wherein
   each spectrum collection sensor node comprises: a broadband spectrum antenna, a delayer, an ADC, a first baseband processing module, a Digital-to-Analog Converter (DAC) and a transmitting antenna connected in sequence,
      wherein the broadband spectrum antenna is configured to receive an electromagnetic wave in free space to obtain a first analog signal, wherein a frequency range of the electromagnetic wave in free space is 0 Hz to 6 GHz;
      the delayer is configured to delay the first analog signal to conform the first analog signal to a sub-Nyquist sampling criterion;
      the ADC is configured to convert the delayed first analog signal into a digital signal;
      the first baseband processing module is configured to process the digital signal obtained by sampling;
      the DAC is configured to convert the processed digital signal into a second analog signal; and
      the transmitting antenna is configured to transmit the second analog signal into free space.

2. The deployment structure of wireless sensor network combined with SFFT and COA according to claim 1, wherein the first baseband processing module comprises:

a fast Fourier transform (FFT) module, a preprocessing module, and a pulse-shaping filter,
wherein the FFT module is configured to perform an FFT on the digital signal obtained by sampling with the ADC;
the preprocessing module is configured to process the digital signal outputted from the FFT module by performing channel compensation, power compensation, and rotation factor compensation on the signal and packaging the signal into a signal frame; and
the pulse-shaping filter is configured to reduce inter-symbol interference, wherein a signal passing through the pulse-shaping filter is sent to the DAC.

3. The deployment structure of wireless sensor network combined with SFFT and COA according to claim 1, wherein the sink node comprises: a receiving antenna, an ADC, and a second baseband processing module connected in sequence, wherein the second baseband processing module comprises a frame synchronization module, a post-processing module, and a data memory;
the receiving antenna is configured to receive the signal obtained by superimposing in an over-the-air manner the signals transmitted by all the spectrum collection sensor nodes;
the ADC is configured to convert an analog signal from the receiving antenna into a digital signal;
the frame synchronization module is configured to determine a frame header of the digital signal, align symbols at the same time, extract a digital signal of a data domain portion and send the extracted digital signal to the post-processing module;
the post-processing module is configured to adjust a power gain of the digital signal of the data domain portion, to render an output result of the post-processing module a correct spectrum; and
the data memory is configured to store the obtained spectrum to complete spectrum reconstruction.

4. A broadband wireless spectrum reconstruction method applied to the deployment structure of wireless sensor network according to claim 1, wherein a total number of spectrum collection sensor nodes in the wireless sensor network is L, and L is a positive integer, the method comprising the following steps:
receiving a signal in free space, sampling the signal with an ADC, performing SFFT and preprocessing on the sampled digital signal, transmitting the sampled digital signal into the air, and completing superposition computation over the air finally, by each spectrum collection sensor cooperating with other spectrum collection sensor nodes; and
receiving a signal obtained by superimposing in an over-the-air manner signals transmitted by all the spectrum collection sensor nodes, and extracting a data domain from a received signal frame through frame synchronization and post-processing to complete spectrum reconstruction, by the sink node,
wherein each spectrum collection sensor node comprises:
a broadband spectrum antenna, a delayer, an ADC, a first baseband processing module, a Digital-to-Analog Converter (DAC) and a transmitting antenna connected in sequence; and
the receiving a signal in free space, sampling the signal with an ADC, performing SFFT and preprocessing on the sampled digital signal, transmitting the sampled digital signal into the air, and completing superposition computation over the air finally, by each spectrum collection sensor cooperating with other spectrum collection sensor nodes, comprises:
receiving, by the broadband spectrum antenna, an electromagnetic wave in free space to obtain a first analog signal, wherein a frequency range of the electromagnetic wave in free space is 0 Hz to 6 GHz;
delaying, by the delayer, the first analog signal to conform the first analog signal to a sub-Nyquist sampling criterion;
converting, by the ADC, the delayed first analog signal into a digital signal;
processing, by the first baseband processing module, the digital signal obtained by sampling;
converting, by the DAC, the processed digital signal into a second analog signal; and
transmitting, by the transmitting antenna, the second analog signal into free space.

5. The method according to claim 4, wherein the first baseband processing module comprises: an FFT module, a preprocessing module, and a pulse-shaping filter; and
the processing, by the first baseband processing module, the digital signal obtained by sampling comprises:
performing, by the FFT module, a fast Fourier transform on the digital signal obtained by sampling with the ADC;
processing, by the preprocessing module, the digital signal outputted from the FFT module by performing channel compensation, power compensation, and rotation factor compensation on the signal and packaging the signal into a signal frame; and
reducing, by the pulse-shaping filter, inter-symbol interference, wherein a signal passing through the pulse-shaping filter is sent to the DAC.

6. The method according to claim 4, wherein the sink node comprises: a receiving antenna, an ADC, and a second baseband processing module connected in sequence, the second baseband processing module comprising a frame synchronization module, a post-processing module, and a data memory; and
the receiving a signal obtained by superimposing in an over-the-air manner signals transmitted by all the spectrum collection sensor nodes, and extracting a data domain from a received signal frame through frame synchronization and post-processing to complete spectrum reconstruction, by the sink node, comprises:
receiving, by the receiving antenna, the signal obtained by superimposing in an over-the-air manner the signals transmitted by all the spectrum collection sensor nodes;
converting, by the ADC, an analog signal from the receiving antenna into a digital signal;
determining a frame header of the digital signal, aligning symbols at the same time, extracting a digital signal of a data domain portion and sending the extracted digital signal to the post-processing module, by the frame synchronization module;
adjusting, by the post-processing module, a power gain of the digital signal of the data domain portion to render an output result of the post-processing module a correct spectrum; and
storing, by the data memory, the obtained spectrum to complete spectrum reconstruction.

7. A broadband wireless spectrum reconstruction method applied to the deployment structure of wireless sensor network according to claim 1, wherein a total number of spectrum collection sensor nodes in the wireless sensor network is L, and L is a positive integer, the method comprising the following steps 1) to 6), wherein in step 1), L spectrum collection sensor nodes sample a signal s(t) in free space with a sampling frequency of $f_s/L$ and a sampling time of $T_s$, wherein an $l^{th}$ spectrum collection sensor node collects a sequence $s_l(m)$ with a length of M, L being a positive integer;

in step 2), each spectrum collection sensor node performs an M-point FFT on the collected sequence $s_l(m)$ through the FFT module in the first baseband processing module to obtain a sparse spectrum sequence, where step 2) is expressed by the following formula:

$$X_l(k) = \sum_{m=0}^{M-1} s_l(m) W_M^{km},$$

wherein k=0 . . . M−1, and $$W_M^{km} = e^{-j\frac{2\pi}{M}km}$$

is a rotation factor in Fourier transform;

in step 3), a to-be-sent symbol sequence is obtained after the sparse spectrum sequence $X_l(k)$ passes through the preprocessing module, wherein step 3) is expressed by the following formula:

$x_l(k) = \varphi_l W_N^{kl} X_l(k \bmod M)$, wherein k=0 . . . N−1, $$W_N^{kl} = e^{-j\frac{2\pi}{N}kl}$$

is a rotation factor in Fourier transform, mod is a remainder operation, $h_l$ is a channel response of the $l^{th}$ spectrum collection sensor node, η is a receiving level, $\varphi_l$ is a preprocessing coefficient of the $l^{th}$ spectrum collection sensor node, and $h_l \varphi_l = \eta$;

in step 4), the to-be-sent symbol sequence $x_l(k)$ is transmitted into the air after passing through the pulse-shaping filter;

in step 5), signals transmitted by the L spectrum collection sensor nodes are superimposed over the air and received by the sink node through a wireless channel, wherein a received signal is expressed by the following formula:

$$\hat{S}(k) = \eta \sum_{l=0}^{L-1} W_N^{kl} X_l(k \bmod M) + n(k),$$

wherein k=0 . . . N−1, and n(k) is noise; and in step 6), the sink node performs a post-processing module to obtain a reconstructed broadband wireless spectrum, wherein the reconstructed broadband wireless spectrum is expressed by the following formula:

$\hat{S}(k)/\eta = S(k) + n(k)/\eta$, wherein $$S(k) = \sum_{l=0}^{L-1} W_N^{kl} \sum_{m=0}^{M-1} s_l(m) W_M^{km} = \sum_{n=0}^{N-1} s(nT_s) W_N^{kn}$$

is a spectrum of an ideal noiseless signal s(n) with an observation bandwidth $f_s$, k=0 . . . N−1, and n(k) is noise.

* * * * *